United States Patent [19]

Woodward

[11] 4,243,991
[45] Jan. 6, 1981

[54] ANTENNA FEED FOR SCAN-WITH-COMPENSATION TRACKING

[75] Inventor: Elmer D. Woodward, Alexandria, Va.

[73] Assignee: The United States of America as represented by the Secretary of the Navy, Washington, D.C.

[21] Appl. No.: 910,260

[22] Filed: May 30, 1978

[51] Int. Cl.³ .............................................. H01Q 3/10
[52] U.S. Cl. ................................. 343/777; 343/16 M; 343/854; 333/21 A
[58] Field of Search ............... 343/761, 786, 854, 779, 343/16 M; 333/21 A

[56] References Cited

U.S. PATENT DOCUMENTS

| 4,052,724 | 10/1977 | Takeichi et al. | 343/786 |
| 4,077,039 | 2/1978 | Ren et al. | 343/786 |

Primary Examiner—Eli Lieberman

Attorney, Agent, or Firm—Richard S. Sciascia; Ervin F. Johnston

[57] ABSTRACT

An antenna feed for decreasing the scan modulation of the radiated signal of a radar which tracks by the method known as scan-with-compensation. The antenna feed is comprised of a coaxial line fed dipole located on the axis of a circular waveguide for radiating a single on-axis unmodulated pencil-beam during transmission. The antenna feed further comprises two parallel radiators located equally distant and on opposite sides of the transmitting circular waveguide radiator and functions during reception only. Rectangular waveguides connect the two parallel radiators with the central radiator so as to give rise to orthogonal signals in the central radiator upon reception of echo signals. An ATR tube connects the dipole to the central axial waveguide during transmission and isolates it during reception. The radiating dipole is mounted so as to remain fixed while the central circular waveguide and the two parallel reception waveguides rotate during scanning.

19 Claims, 11 Drawing Figures

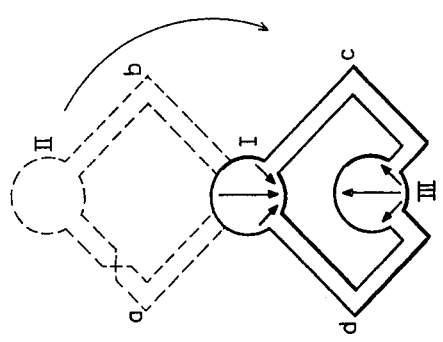
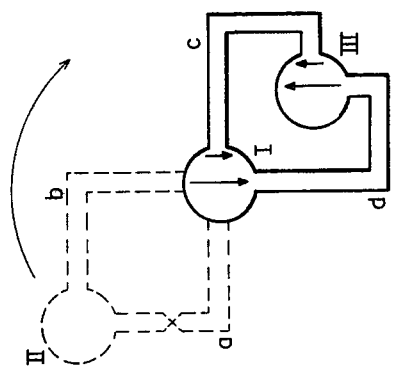
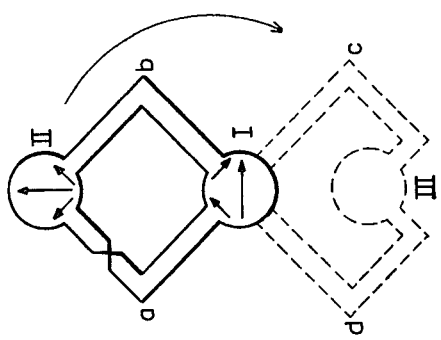
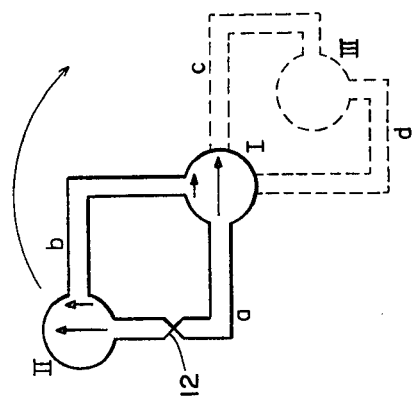
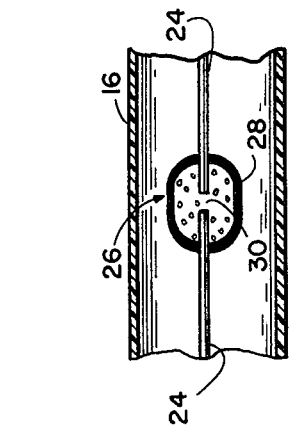
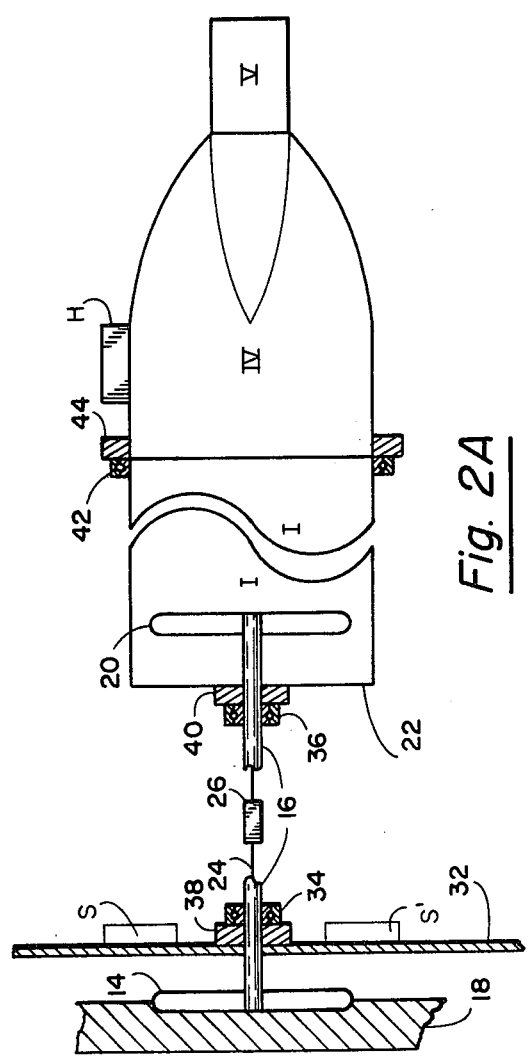

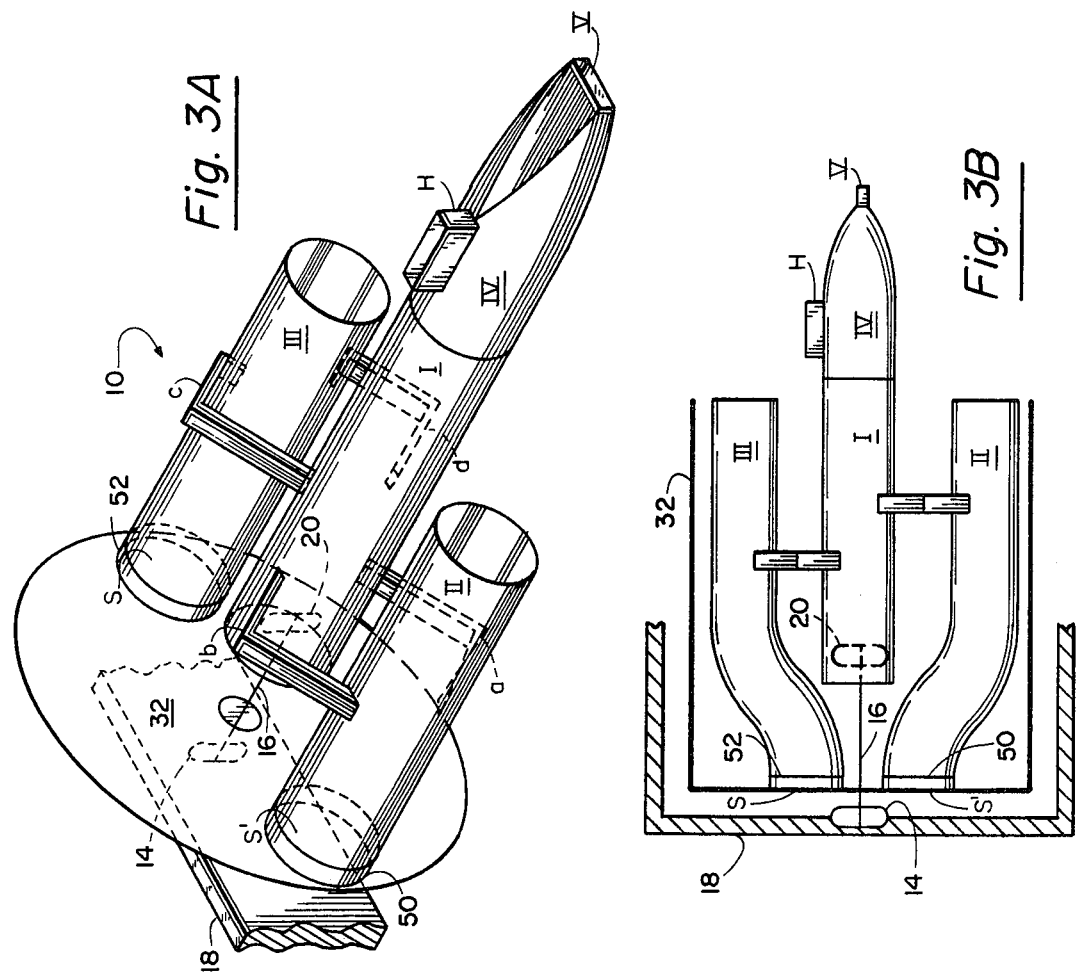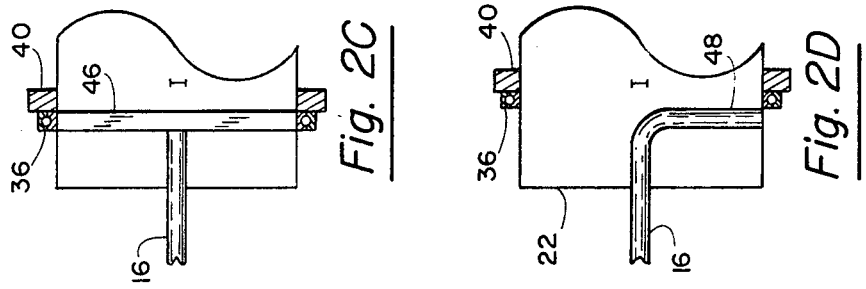

ANTENNA FEED FOR SCAN-WITH-COMPENSATION TRACKING

BACKGROUND OF THE INVENTION

Scan-with-compensation is a method of radar tracking which, like the more familiar conical scan tracking, generates a tracking error signal from the modulation of a target echo which results from rotating about the antenna scanning axis an antenna pattern which is offset in angle or squinted by an amount which is typically one-half to one-quarter of the half power one-way beam width of the antenna. Unlike conical-scan tracking, the antenna feed is used to generate two pencil-beam radiation patterns which are squinted by equal but opposite angles with respect to the scan axis. This type of radiation pattern is illustrated in FIG. 1 of U.S. Pat. No. 4,028,708 issued June 7, 1977 to the present applicant.

In the aforementioned patent, it was shown how by the use of mode transducers between the $TE_{11}$ mode of circular waveguide and the $TE_{10}$ mode of rectangular guide, two side-by-side parallel circular guide radiators could be connected to a third circular guide, the central axis of which lies in prolongation of the line parallel to and midway between the two circular guide radiators. By one disposition of the innerconnections of the mode transducers on the three waveguides, the aforementioned patent demonstrates that whatever polarization of the $TE_{11}$ mode was established in the axial guide would be preserved in the two parallel guide radiators and would not change as the entire assembly of three guides and their connections rotated about the axis of the assembly. By another innerconnection, the polarization in one of the parallel guides would be the same as that in the axial guide but the polarization in the other parallel guide would be perpendicular; by symmetry and reciprocity, it followed that if waves of the same polarization, but of course possibly differing in amplitude, phase, or modulation, were introduced into the two parallel guides, the wave in each of these guides would give rise to an independent field component in the axial guide and these latter components would be orthogonal in polarization and thereby separable. This behavior is likewise independent of the rotation of the guide assembly about its axis.

The second above described configuration is suitable for scan-with-compensation radar tracking as the focused beams of the two parallel radiators rotate together about the tracking axis with equal and opposite squint angles and the signals received by them are orthogonal and hence separable after passing from the axial guide through a choke joint to a non-rotating circular guide.

The scan-with-compensation tracker preferaby has an unmodulated, axially directed illumination field when transmitting. This can be approximated by the sum field of the parallel guide radiators when connected in the first mentioned manner so that both radiator emit fields with fixed parallel polarization. As the assemblage rotates about its axis, the sum field will be only slightly modulated in amplitude, at least at points near the boresight axis. This form of scan-with-compensation antenna feed, however, has the following problems: the necessity for switching the connections between the axial guide and the two parallel guides from the transmitting to the receiving configuration (which can be accomplished by circulators or gas-discharge switches); residual low-scan modulation; and the loss of the transmitted beam because of the high degree of squint adopted to minimize scan modulation.

SUMMARY OF THE INVENTION

The present invention relates to a scan-with-compensation radar antenna feed which alleviates the above described problems. The scan-with-compensation radar antenna feed disclosed herein decreases the scan modulation of the radiated signal by generating a single on-axis unmodulated transmit radar pencil-beam while generating the two required pencil-beams squinted equally off-axis, in opposite directions, during reception. The absence of scan modulation or a very low level of such modulation is a decided ECCM advantage.

STATEMENT OF THE OBJECTS OF THE INVENTION

Accordingly, it is the primary object of the present invention to disclose a novel antenna feed particularly useful with scanning-with-compensation radar tracking which emits a substantially unmodulated transmit radar beam.

It is another object of the present invention to disclose an antenna feed that generates a single on-axis unmodulated transmit pencil-beam during transmission and that generates two pencil-beams squinted equally off-axis in opposite directions, during reception.

Other objects, advantages and novel features of the invention will become apparent from the following detailed description of the invention when considered in conjunction with the accompanying drawings.

BRIEF DESCRIPTION OF THE DRAWINGS

FIGS. 1A, 1B, 1C and 1D are schematic cross sections of three circular waveguides and four rectangular waveguides coupled in accordance with the present invention.

FIG. 2A is a longitudinal cross section of the central radiating circular waveguide of the present invention and further illustrating, in cross section, the two dipole antennas operably coupled to the circular waveguide and further illustrating in cross section the dual mode rectangular to circular waveguide transducer coupled to the circular waveguide.

FIG. 2B is an enlarged view of a portion of the coaxial conductor interconnecting the two dipole antennas illustrated in FIG. 1A and further illustrating the ATR switch serially connected in the central conductor of the coaxial cable.

FIGS. 2C and 2D are schematic illustrations of two other well-known methods of joining a coaxial line to a circular waveguide.

FIG. 3A is a perspective view of the scan-with-compensation feed assembled from the components illustrated in FIGS. 1A through 1D and 2A and 2B.

FIG. 3B is a vertical longitudinal section of more nearly correct proportions of the elements illustrated in FIG. 3A.

DESCRIPTION OF THE PREFERRED EMBODIMENT

Figure 4:
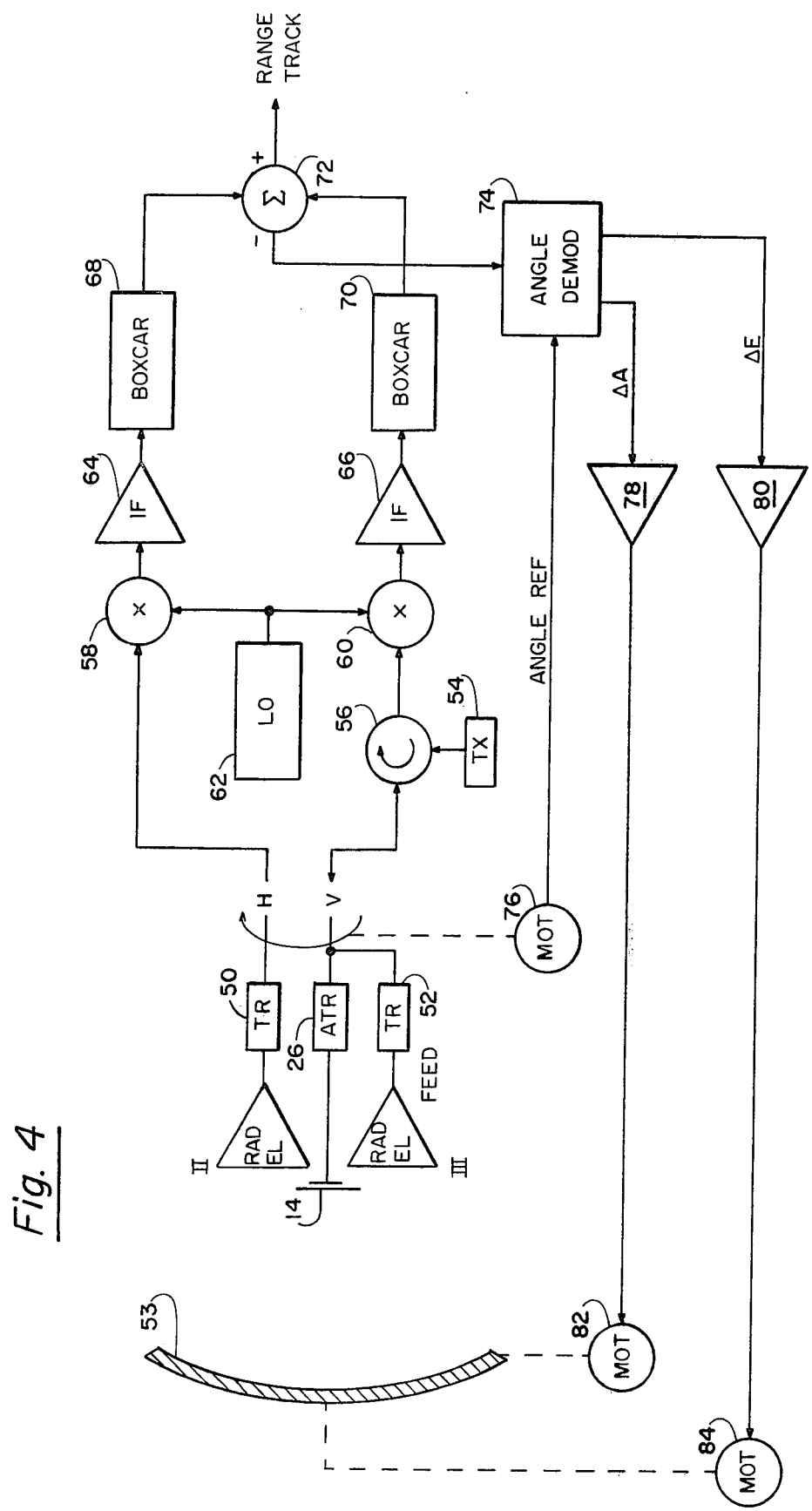
FIG. 4 is a simplified block diagram of the antenna feed in accordance with the present invention as incorporated into a scan-with-compensation tracking radar.

In order to facilitate an understanding of the operation of the antenna feed 10 of the present invention, reference will first be had to the schematic cross sections of three circular waveguides, I, II, and III and four rectangular waveguides a, b, c, and d illustrated in FIGS. 1A through 1D. Rectangular waveguides a and b connect circular waveguides I and II as shown in FIG. 1A. Waveguide a has a 180° twist 12 about its longitudinal axis in order to effectuate a phase reversal for signals propagating therethrough. Rectangular waveguides c and d connect waveguide I to waveguide III. The entire assembly comprised of the guides I, II, III and a, b, c, and d is capable of rotating in the plane of the paper about a axis which coincides with the axis of guide I. Waveguides a and b are necessarily of the same length as also are guides c and d. All four rectangular waeguides may conveniently be equal in length although this is not a necessary condition.

FIG. 1A shows the assembly of guides in a particular angular configuration in its rotation. A vertically polarized wave, represented by the large arrow within waveguide II is propagating in waveguide II in the fundamental $TE_{11}$ mode. The junctions of waveguides a and b with waveguide II constitute a dual mode circular-to-rectangular waveguide transducer as do the junctions of a and b with I. The small arrow in waveguide II indicates that a component of the vertically polarized wave couples from waveguide II to waveguide b. Because of its orthogonality to the plane of polarization, there is no component coupled into guide a. The small arrow in guide I represents the component coupled through waveguide b. Since it is the only component, the resultant is a horizontally polarized wave, represented by the large arrow in waveguide I.

FIG. 1B represents the assembly of waveguides rotated 45° clockwise about the axis of guide I. The same vertically polarized wave is present in waveguide II and couples components represented by the samll arrows into guides a and b. These components appear in guide I as shown by the small arrows and have a resultant horizontally polarized as indicated by the large arrow. Thus the vertically polarized signal in waveguide II gives rise to a horizontally polarized signal in I irrespective of the rotation of the guide assembly. Likewise, a horizontally polarized signal in II would give rise to a vertically polarized signal in I. It is noted that the 180° twist 12 in guide a is essential to the change in the polarization plane which is invariant with rotation.

FIGS. 1C and 1D are similar to FIGS. 1A and 1B and demonstrate that the arrangement by which rectangular guide c and d connect waveguide III to I will result in a vertically polarized wave in waveguide III giving rise to a vertically polarized wave in I and that this coupling is invariant with respect to rotation.

The foregoing FIGS. 1A through 1D and the description thereof above illustrate the phenomenon that polarized signals (of any polarization) applied to guides II and III as, for example, by reception with a microwave antenna will result in orthogonally polarized signals in waveguide I. One of these orthogonal signals will be uniquely coupled to waveguide II and the other to waveguide III. Since they are orthogonal, they are uncoupled and are separable by suitably polarized mode filters, polarization sensitive detectors or similar means. Furthermore, this unique coupling between circular guides II and III and the orthogonal modes in waveguide I is invariant with rotation of the assembly of the guides in the plane of the paper with respect to the plane of polarization of a given signal.

Referring now to FIG. 2A there is illustrated a longitudinal cross section through circular waveguide I and adjoined parts of the invention. 14 comprises a dipole antenna fed by a coaxial line 16. Dipole antenna 14 and coaxial line 16 are supported and prevented from rotating by dielectric support 18 which is transparent to microwaves and is fixed to some non-rotating part of the antenna structure (not shown). On the end of coaxial cable 16 remote from dipole antenna 14 is another dipole radiator 20 which is disposed within circular waveguide I and is spaced approximately ¼ wavelength from the end 22 of the circular waveguide I. The center conductor 24 of the coaxial cable 16 is interrupted by a coaxial ATR switch 26 which is shown in the enlarged view of FIG. 2B. The gap between the ends of the interrupted center conductor is surrounded by a dielectric capsule 28 which contains an ionizable gas. When an electric field exceeding the ionization potential of the gas exists across the gap 30 the switch 26 breaks down and a conductive discharge will form across the gap so that electromagnetic TEM mode waves can propagate through the coaxial line 16 between the dipole antennas 14 and 20. However, electromagnetic waves which are of insufficient power to cause the gap 30 to break down will not propagate across the switch 26 and the two dipole antennas 14 and 20 will be isolated from each other. Spaced approximately ¼ wavelength from dipole antenna 14 is a metallic ground plane 32 which is perpendicular to the coaxial line 16 which is in prolongation of the axis of the waveguide I which is the axis or rotation of the waveguide assembly 10. Ground plane 32 is affixed to waveguide I by mechanical connections to waveguides II ad III which are in turn mechanically connected to the circular waveguide I by the rectangular waveguides a, b, c and d as is illustrated in FIG. 3A. Upon the ground plane 32 are two regions S and S' near to and on opposite sides of the axis of rotation, i.e. the longitudinal axis of circular waveguide I. The natures of the region S and S' will be discussed below. Bearings 34 and 36 and choke joints 38 and 40 permit the rotation of the ground plane 32, waveguides II and III and waveguides a, b, c and d with respect to the stationary dipole antenna 14, the dielectric support 18, the coaxial cable 16 and the dipole antenna 20 without loss of electrical contact. At the far right end of waveguide I, waveguide I is coaxial with a dual-mode rectangular-to-circular waveguide IV and is attached to it by a bearing 42 and choke joint 44 so that transducer IV remains fixed while circular waveguide I and the parts attached to it rotate about their common axis. Dual-mode rectangular-to-circular waveguide transducer IV may be of any known form; the form shown has a rectangular guide H fixed perpendicular to one wall of the transducer IV with its broad walls parallel to the plane of the paper and guide IV beyond its junction with H is smoothly deformed into a rectangular guide V with its narrow walls parallel to the plane of the paper. Guide H couples only to horizontal polarized waves in guide IV and guide V couples only to vertically polarized waves. Other known forms of dual-mode circular-to-rectangular waveguide transducers, although differing in detail, will perform the same function of coupling separate ports to the two orthogonal waves in guide IV and thus separating them for signal processing.

FIGS. 2C and 2D show two other well-known methods of joining a coaxial line to a circular waveguide. These are, respectively, a T-junction and an L-junction in which the vertical post 46 or 48 across a short non-rotating section of guide I couples to the vertically polarized wave in guide I and induces the RF power wave onto the center conductor of coaxial line 16. The bearings 36 and 40 are relocated as shown.

Referring now to FIG. 3A there is illustrated a perspective view of the entire scan-with-compensation feed 10 assembled from the previously described components. The regions S and S' are the junctions of waveguides II and III with the ground plane 32. These junctions in the illustrated embodiment are made through the waveguide TR switch tubes 50 and 52. The entire assembly of the circular guides I, II and III as well as the rectangular guides a, b, c and d and the ground plane 32 rotate about the axis of circular guide I on the bearings 34 and 40 of coaxial line 16 and the bearing 42 between guide I and guide IV. These bearings and their associated chokes have been omitted from FIG. 3A for the sake of clarity. The electrical length of guide II plus guides a and b is such that the short formed at S' when TR tube 50 is discharged by high incident power will be reflected to the junctions of a and b with I as shorts so that no power except that absorbed by the arc in tube 50 is coupled from I into II via rectangular guides a and b. The same applies to guides III, c and d. The junction plane of a and b with I and that of c and d with that of I are displaced along I to prevent direct coupling between guides II and III. The position of ATR tube 26 (not shown in FIG. 3A) in coaxial line 16 is such that the open it represents when undischarged is reflected as a short when looking into guide I from the planes of the junctions of guides a and b and likewise c and d with I.

The method of operation of the antenna feed 10 is as follows. A power pulse of RF energy from the radar transmitter is applied to port V of guide IV and propagates in guide I as a vertically polarized wave. Power from this wave coupled off through a and b into II and through c and d into III cause the TR tubes 50 and 52 to discharge so that there is no radiation through S and S' and shorts are reflected back to the junctions a, b, c, and d with waveguide I so that only the power absorbed in the arcs of 50 and 52 is dissipated from the wave in I which continues on until it reaches vertical non-rotating dipole 20. Dipole 20 transforms the transmitter power pulse into a TEM wave in coaxial line 16 which is of high power and discharges the ATR tube 26 and is transmitted to the vertical dipole 14 which with ground plane 32 acts as the illuminator of the radar tracking antenna focusing means (not shown) to develop an on-axis unmodulated transmit beam. The discharges of 50 and 52 in the apertures of S and S' reflect the waves from 14 so that the ground plane 32 is electrically complete and the illumination of the focusing means is not affected by the angular position of S and S'. Additionally, the transmitted beam from the antenna 14 is not modulated by the rotation of the rotating feed elements. When the transmitted pulse ceases, the gas discharges in tubes 26, 50 and 52 are extinguished, dipole 14 is disconnected from dipole 20 and hence from waveguide I and the apertures S and S' are orthogonally connected to I. Because S and S' are equally spaced on opposite sides of the axis of rotation, the antenna beams they form on reception will be equally squinted in opposite directions and the orthogonal signals of these two beams in guide I formed by the echo from an off-axis target will be scan-modulated with equal amplitudes in opposite phases to thus produce the signal necessary for scan-with-compensation tracking. These two receive-beam signals are separated at ports H and V for known methods of detection and scan-with-compensation processing.

It is to be understood that the foregoing FIGS. are schematic in nature and are not intended to be to scale. For example, the best match between circular waveguide and rectangular guide is obtained when the diameter of the former is approximately equal to the diagonal of the latter. A vertical longitudinal section of more nearly correct proportions is shown in FIG. 3B. In this FIG. it will be noted that guides II and III have been bent so that their apertures S and S' are spaced as closely as possible on either side of the coaxial line 16. This is often desirable to optimize the squint angles of the two conical scanning receiving beams for best crossover level and tracking error slope. Provided the S-bends in these guides are not abrupt, their polarization properties will not be adversely affected.

The circular waveguide TR tubes 50 and 52 have been shown placed in the apertures S and S'. Actually, however, they may be placed at any position in guides II and III such that, when they are fired, shorts are reflected to both the positions of the apertures S and S' and to the junctions of the rectangular guides with guide I. In fact, the tubes 50 and 52 could be replaced by pairs of TR tubes in the rectangular guides a, b, c, and d. It would, of course, be necessary in that embodiment to utilize four TR's. The closer the TR tubes are to the apertures S and S' the wider will be the band over which these apertures will act as perfect extensions of the surrounding ground plane surface 32 and thus not introduce scan modulation on the transmitted beam. On the other hand, the closer the TR tubes are to the junctions of a, b, c, and d to guide I the broader will be the band over which these junctions will neither absorb power from the transmitted pulse nor reflect transmitted power back into ports H and V. The placement of these TR tubes is thus a design decision.

Referring now to the schematic block diagram of FIG. 4 the feed 10 of the present invention is illustrated as incorporated into a scan-with-compensation tracking radar. 53 represents the focusing portion of the radar antenna which forms a single on-axis pencil-beam during transmission and two pencil-beams squinted equally off-axis in opposite directions during reception. This focusing element is shown with vertical hatching to indicate it is preferably of a polarization-filtering type, either inherently such as a transflectortwistflector cassegrain antenna or a reflector made of strips in one plane only or having an added polarization filter. This is desirable because cross polarized reflections received through guides II and III will be coupled to the wrong ports, i.e. V and H instead of, respectively, H and V and will thus interfere with tracking. Such cross-polarized received signals may originate from the natural partial depolarization of echoes from complex and irregular targets, from propagation through weather clutter, or from the use of cross-polarized jammers. The transmitter 54 is coupled to port V by a circulator 56 or other duplexer and as explained above couples to vertical dipole 14 and radiates an on-axis, unmodulated transmit beam. The echoes received in guides II and III are separated as described at ports H and V and are then processed through matched mixers 58 and 60 receiving an input from local oscillator 62. IF amplifiers 64 and 66 amplify the mixer outputs and furnish input signals to boxcar detectors 68 and 70 in a well known manner. Their detected video signals are subtracted in summing unit 72, the difference signal going to an angle demodulator 74 which also receives an angle reference signal from the motor 76 which drives the rotating feed elements, as is indicated by the dotted line. The azimuth and elevation error signals ΔA and ΔE are amplified by amplifiers 78 and 80 and power the servo motors 82 and 84 which move the antenna tracking axis to follow the target. It is to be understood that the schematic of FIG. 4 is only one conventional method of scan-with-compensation tracking and that other known methods of scan-with-compensation signal processing will function equally well with the scanning feed 10 of the present invention.

A novel antenna feed for scan-with-compensation radar tracking has thus been disclosed. To summarize the invention, the device comprises two parallel guides connected to an axial guide in such a way as to maintain constant polarization at their input apertures during receiving while the received signals are orthogonal and separable in the axial waveguide and independent of rotation of the assembly about its axis. An on-axis dipole radiator is used during transmission and is connected by an ATR tube to the axial waveguide during transmission to thereby isolate it during reception and to generate a single on-axis unmodulated pencil-beam during transmission. The dipole and its feed coax with the ATR tube and the waveguide-coax transducer remain fixed while the waveguides rotate during scanning. Additionally, TR tubes are used to prevent radiation from the parallel guide apertures. All these elements thus combine to achieve scan-with-compensation tracking while overcoming the faults of the previously disclosed feed construction.

Obviously many modifications and variations of the present invention are possible in the light of the above teachings. It is therefore to be understood that within the scope of the appended claims the invention may be practiced otherwise than as specifically described.

What is claimed is:

1. An antenna feed comprising:
   first means for receiving signals from a transmitter and for generating a single on-axis unmodulated transmit radar pencil beam therefrom; and
   second means for receiving echo signals reflected by a target within said transmitted pencil beam, for forming first and second pencil beams squinted equally off-axis in opposite directions, and being operably coupled to said first means such that upon reception of echo signals from an off-axis target, said first pencil beam produces a first signal in said first means, said second pencil beam produces a second signal in said first means and said first and second signals are orthogonal.

2. The feed of claim 1 wherein said first and second orthogonal signals are scan-modulated with equal amplitudes and opposite phases.

3. The feed of claim 2 wherein said first means comprises:
   a stationary dual mode circular-to-rectangular waveguide transducer;
   a rotatable circular waveguide operably coupled to said stationary dual mode circular-to-rectangular waveguide transducer;
   a first antenna mounted within said circular waveguide;
   a second antenna operably coupled to said first antenna and disposed exterior of said circular waveguide.

4. The feed of claim 3 wherein said first means further comprises:
   a coaxial line connecting said first antenna to said second antenna, said coaxial line having a center conductor;
   said center conductor having first and second ends; and
   switch means serially connected between said first and second ends for preventing the propagation of energy below a predetermined level between said first and second antennas.

5. The feed of claim 4 wherein said switch means comprises an ATR switch.

6. The feed of claim 4 wherein said first and second antennas are dipole antennas.

7. The antenna feed of claim 1 wherein said second means comprises:
   first and second circular waveguides operably connected to said first means.

8. The antenna feed of claim 7 wherein said first means comprises:
   a stationary dual mode circular-to-rectangular waveguide transducer;
   a rotatable circular waveguide operably coupled to said stationary dual mode circular-to-rectangular waveguide transducer;
   a first antenna mounted within said circular waveguide; and
   a second antenna operably coupled to said first antenna and disposed exterior of said circular waveguide.

9. The feed of claim 8 wherein said first means further comprises:
   a coaxial line connecting said first antenna to said second antenna, and having a center conductor, said center conductor having first and second terminations; and
   switch means serially connected to said first and second terminations for preventing the propagation of energy below a predetermined level between said first and second antennas.

10. The feed of claim 9 wherein said first and second antennas are dipole antennas.

11. The feed of claim 8 further comprising:
    first and second rectangular waveguides operably connected between said first circular waveguide and said rotatable circular waveguide; and
    third and fourth rectangular waveguides operably connected between said second circular waveguide and said rotatable circular waveguide.

12. The feed of claim 11 wherein said fourth rectangular waveguide has a 180° phase reversal twist therein.

13. The feed of claim 11 wherein the central longitudinal axis of said rotatable circular waveguide is parallel to the central axis of said first and second waveguides and wherein said rotatable circular waveguide is equidistant from said first and second circular waveguides.

14. The feed of claim 10 wherein said coaxial line center conductor lies in the same line as the longitudinal axis of said rotatable circular waveguide.

15. The feed of claim 13 wherein said first and second circular waveguides join a ground plane conductor, the plane of which is normal to the longitudinal axis of said first and second circular waveguides.

16. The feed of claim 15 further comprising:
    switch means operably associated with said first and second circular waveguides and said ground plane for preventing the radiation of energy out of said first and second circular waveguides in response to the receipt by said first means of said transmitter signals.

17. The feed of claim 16 wherein said switch means comprises a TR switch disposed within each said first and second circular waveguides.

18. The feed of claim 17 wherein said first and second circular waveguides rotate along with said rotatable circular waveguide.

19. The feed of claim 18 wherein said ground plane rotates along with said rotatable circular waveguide.

* * * * *